United States Patent
Chen et al.

(10) Patent No.: US 12,067,694 B2
(45) Date of Patent: Aug. 20, 2024

(54) METHOD FOR GENERATING METADATA, IMAGE PROCESSING METHOD, ELECTRONIC DEVICE, AND PROGRAM PRODUCT

(71) Applicant: Dell Products L.P., Round Rock, TX (US)

(72) Inventors: Qiang Chen, Shanghai (CN); Pedro Fernandez Orellana, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 439 days.

(21) Appl. No.: 17/672,369

(22) Filed: Feb. 15, 2022

(65) Prior Publication Data

US 2023/0237613 A1    Jul. 27, 2023

(30) Foreign Application Priority Data

Jan. 21, 2022 (CN) .......................... 202210071781.8

(51) Int. Cl.
*G06T 3/40* (2024.01)
*G06T 7/00* (2017.01)
*G06T 7/11* (2017.01)

(52) U.S. Cl.
CPC .............. *G06T 3/40* (2013.01); *G06T 7/0002* (2013.01); *G06T 7/11* (2017.01);
(Continued)

(58) Field of Classification Search
CPC . G06T 3/40; G06T 7/0002; G06T 7/11; G06T 2207/10016; G06T 2207/20021;
(Continued)

(56) References Cited

U.S. PATENT DOCUMENTS

2019/0130530 A1    5/2019  Schroers et al.
2020/0104992 A1*   4/2020  Schumacher ........... G06F 18/40

FOREIGN PATENT DOCUMENTS

WO    WO-2022073796 A1 *   4/2022  ............. G06T 17/00

OTHER PUBLICATIONS

Wikipedia, "Google Stadia," https://en.wikipedia.org/wiki/Google_Stadia, Aug. 11, 2021, 15 pages.
(Continued)

*Primary Examiner* — Neil R McLean
(74) *Attorney, Agent, or Firm* — Ryan, Mason & Lewis, LLP

(57) ABSTRACT

A method in an illustrative embodiment includes dividing a first image having a first resolution into a plurality of image patches, and converting each of the plurality of image patches into an image patch having a second resolution by using a plurality of candidate conversion models, the second resolution being higher than the first resolution. The method may include determining a plurality of quality factors corresponding to the plurality of candidate conversion models for each of the converted image patches. The method may include selecting a conversion model for each image patch from the plurality of candidate conversion models based on the plurality of quality factors and computation load factors of the plurality of candidate conversion models, and generating metadata for converting the first image into a second image having the second resolution based on position information of each image patch and the conversion model selected for each image patch.

20 Claims, 6 Drawing Sheets

(52) U.S. Cl.
CPC ............... *G06T 2207/10016* (2013.01); *G06T 2207/20021* (2013.01); *G06T 2207/30168* (2013.01)

(58) Field of Classification Search
CPC ......... G06T 2207/30168; G06T 3/4053; G06T 5/50; H04N 19/40; H04N 19/59; H04N 21/23418; H04N 21/234363; H04N 21/2662
USPC ........................................................ 382/173
See application file for complete search history.

(56) References Cited

OTHER PUBLICATIONS

Wikipedia, "Video Super Resolution," https://en.wikipedia.org/wiki/Video_Super_Resolution, Jun. 27, 2021, 18 pages.

Amazon Web Services, "AI Video Super Resolution," https://www.amazonaws.cn/en/solutions/ai-super-resolution-on-aws/, Feb. 2020, 6 pages.

Wikipedia, "GeForce Now," https://en.wikipedia.org/wiki/GeForce_Now, Jun. 6, 2021, 5 pages.

Wikipedia, "Xbox Cloud Gaming," https://en.wikipedia.org/wiki/Xbox_Cloud_Gaming, Aug. 9, 2021, 7 pages.

C. Faulkner, "Microsoft's xCloud game streaming is now widely available on iOS and PC," https://www.theverge.com/2021/6/28/22554267/microsoft-xcloud-game-streaming-xbox-pass-ios-iphone-ipad-pc, Jun. 28, 2021, 4 pages.

Wikipedia, "Nvidia Shield TV," https://en.wikipedia.org/wiki/Nvidia_Shield_TV, Jun. 24, 2021, 3 pages.

U.S. Appl. No. 17/400,350, filed in the name of Qiang Chen et al. on Aug. 12, 2021, and entitled "Method, Electronic Device, and Computer Program Product for Video Processing."

U.S. Appl. No. 17/520,908, filed in the name of Qiang Chen et al. on Nov. 8, 2021, and entitled "Method, System, and Computer Program Product for Streaming."

\* cited by examiner

METHOD FOR GENERATING METADATA, IMAGE PROCESSING METHOD, ELECTRONIC DEVICE, AND PROGRAM PRODUCT

RELATED APPLICATION(S)

The present application claims priority to Chinese Patent Application No. 202210071781.8, filed Jan. 21, 2022, and entitled "Method for Generating Metadata, Image Processing Method, Electronic Device, and Program Product," which is incorporated by reference herein in its entirety.

FIELD

Embodiments of the present disclosure relate to the field of video transmission, and more particularly, to a method for generating metadata, an image processing method, an electronic device, and a computer program product.

BACKGROUND

Video content accounts for a large proportion of global Internet business. This makes reducing bandwidth occupation one of the critical factors that drive the development of the Internet. Typically, video transmission is a main pressure on backbone networks and Internet service providers. Recently, many video content providers have lowered the quality of streaming videos of their services to relieve the pressures on Internet service providers. However, in order to reconstruct lower-quality videos into high-quality videos, there is still a high computing capacity requirement and considerable delay at the user side and in associated edge nodes.

SUMMARY

Embodiments of the present disclosure provide a solution for video processing.

In a first aspect of the present disclosure, a method for generating metadata is provided. The method may include dividing a first image having a first resolution into a plurality of image patches. The method may further include converting each of the plurality of image patches into an image patch having a second resolution by using a plurality of candidate conversion models, the second resolution being higher than the first resolution. Further, the method may include determining a plurality of quality factors corresponding to the plurality of candidate conversion models for each of the converted image patches. In addition, the method may include selecting a conversion model for each image patch from the plurality of candidate conversion models based on the plurality of quality factors and computation load factors of the plurality of candidate conversion models, and generating metadata for converting the first image into a second image having the second resolution based on position information of each image patch and the conversion model selected for each image patch.

In a second aspect of the present disclosure, an image processing method is provided. The method includes receiving a first image having a first resolution and metadata for image conversion, the first image including a plurality of image patches, and the metadata indicating a corresponding conversion model, used for converting each of the plurality of image patches, among a plurality of conversion models. The method may further include respectively converting the plurality of image patches into a plurality of image patches having a second resolution based on the metadata, the second resolution being higher than the first resolution. In addition, the method may include generating a second image having the second resolution based on the plurality of converted image patches.

In a third aspect of the present disclosure, an electronic device is provided, including: a processor; and a memory coupled to the processor and having instructions stored therein which, when executed by the processor, cause the electronic device to perform actions including: dividing a first image having a first resolution into a plurality of image patches; converting each of the plurality of image patches into an image patch having a second resolution by using a plurality of candidate conversion models, the second resolution being higher than the first resolution; determining a plurality of quality factors corresponding to the plurality of candidate conversion models for each of the converted image patches; selecting a conversion model for each image patch from the plurality of candidate conversion models based on the plurality of quality factors and computation load factors of the plurality of candidate conversion models; and generating the metadata for converting the first image into a second image having the second resolution based on position information of each image patch and the conversion model selected for each image patch.

In a fourth aspect of the present disclosure, an electronic device is provided, including: a processor; and a memory coupled to the processor and having instructions stored therein which, when executed by the processor, cause the electronic device to perform actions including: receiving a first image having a first resolution and metadata for image conversion, the first image including a plurality of image patches, and the metadata indicating a corresponding conversion model, used for converting each of the plurality of image patches, among a plurality of conversion models; respectively converting the plurality of image patches into a plurality of image patches having a second resolution based on the metadata, the second resolution being higher than the first resolution; and generating a second image having the second resolution based on the plurality of converted image patches.

In a fifth aspect of the present disclosure, a computer program product is provided. The computer program product is tangibly stored on a computer-readable medium and includes machine-executable instructions. The machine-executable instructions, when executed by a machine, cause the machine to perform the methods according to the first and second aspects.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical or similar reference numerals generally represent identical or similar components in the example embodiments of the present disclosure. In the accompanying drawings.

DETAILED DESCRIPTION

Figure 1:
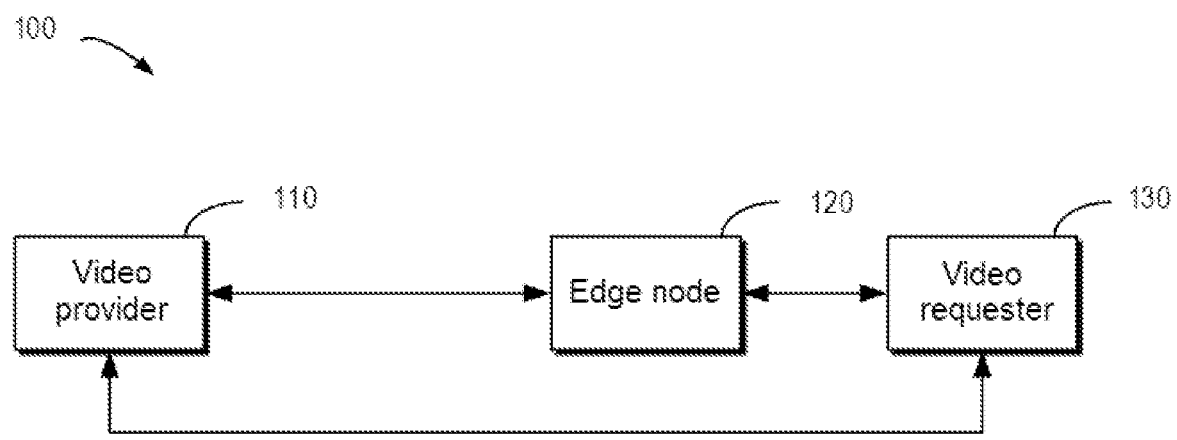
FIG. 1 shows a schematic diagram of an example environment according to an embodiment of the present disclosure.

Principles of the present disclosure will be described below with reference to several example embodiments illustrated in the accompanying drawings.

The term "include" used herein and variants thereof indicate open-ended inclusion, that is, "including but not limited to." Unless otherwise stated, the term "or" means "and/or." The term "based on" denotes "at least partially based on." The terms "an example embodiment" and "an embodiment" indicate "a group of example embodiments." The term "another embodiment" indicates "a group of additional embodiments." The terms "first," "second," and the like may refer to different or the same objects. Other explicit and implicit definitions may also be included below.

As discussed above, in order to save bandwidth resources and reduce network delay, a video provider typically converts an image or video having a high resolution into an image or video having a low resolution and transmits the converted image or video to a video requester. With existing technologies such as Video Super Resolution (VSR), the video requester or an edge node adjacent thereto may perform a high-resolution or super-high-resolution reconstruction on the received image having a low resolution.

The development of conventional video reconstruction technologies, such as the VSR technology, has been applied in a number of fields. For example, in a remote game, a game engine only needs to render each image frame at an edge node or on a user side and reconstruct an image having a low resolution into an image having a high resolution (or high definition) by using the VSR technology, which can significantly save the computational and bandwidth costs of the game engine and can also alleviate delay.

However, video reconstruction technologies typically rely on a more complex image reconstruction or image conversion model, and the computational cost required for training and inferring operations of a super-resolution model based on deep learning is high. The bottlenecks encountered by conventional video reconstruction technologies mainly include the following two aspects.

First, although images or videos output from super-resolution image conversion models based on deep learning or machine learning are advanced in quality and have a quality superior to that of images or videos derived from non-deep learning algorithms, better quality comes at the expense of higher computational requirements. A super-resolution image conversion model may contain a large number of parameters, while a deep learning model mainly consists of convolution operations, which are very complex in nature. In order to efficiently perform these operations, it is desirable to run the super-resolution image conversion model by using a dedicated accelerator such as a graphics processing unit (GPU) or a tensor processing unit (TPU). Even with an accelerator such as a GPU, the reconstruction speed of the super-resolution image conversion model is still slow. Therefore, current video reconstruction technologies such as the VSR technology can only be applied to off-line applications such as off-line video transmission, while for applications requiring real-time reconstruction such as on-line video delivery, high-definition video conferencing, and high-definition remote gaming, the current reconstruction speed makes it difficult to meet requirements.

Second, in order to efficiently perform the convolution operation in deep learning, a large number of GPUs need to be purchased accordingly. It will be appreciated that accelerators such as GPUs are more expensive than central processing units (CPUs). If a large number of expensive accelerators need to be purchased in order to achieve video reconstruction, it would be unacceptable to both video providers and users.

In order to address, at least in part, the above disadvantages, a novel image processing solution is provided in embodiments of the present disclosure. In this solution, a video provider processes each image frame in a video having a low resolution before transmitting the video. Specifically, the video provider first divides each image frame into a plurality of uniform image patches, and performs image conversion on each image patch separately by using at least two image conversion models (e.g., one model is faster but obtains a lower quality converted image, and another model is slower but obtains a higher quality converted image). Thus, the image quality of each image patch after high definition conversion may be calculated. By considering both the processing speed (or the computation load) and the image quality, it is possible to select a suitable model for each image patch in each image frame and record specific information in metadata. Thus, a video requester or an edge node adjacent thereto may reconstruct a video having a high resolution based on the received video having a low resolution and its corresponding metadata.

Embodiments of the present disclosure will be specifically described below with reference to the accompanying drawings.

FIG. 1 shows a schematic diagram of example environment 100 according to an embodiment of the present disclosure. As shown in FIG. 1, environment 100 includes video provider 110, edge node 120, and video requester 130. Video provider 110 may be, for example, a cloud server, a data center, etc. Video provider 110 may process a video (e.g., reduce a resolution), and then send the processed video to reduce network bandwidth occupation.

Video requester 130 may interact with a user (not shown). Video requester 130 may be, for example, a mobile phone, a tablet computer, a desktop computer, a laptop, a game machine, etc. In some embodiments, video requester 130 and edge node 120 may be arranged together. In some embodiments, video requester 130 may be arranged separately from edge node 120, but they may communicate with each other. Video requester 130 may communicate directly with video provider 110, or may communicate with video provider 110 via edge node 120.

Edge node 120 may be one or more edge devices that may be used for edge storage and edge computing. For example, when video requester 130 issues a video transmission request to video provider 110, a requested video may be processed by video provider 110 (e.g., to reduce a resolution) before being sent to edge node 120 adjacent to video requester 130. Edge node 120 reconstructs or converts the received video and then transmits the reconstructed or converted video to video requester 130. However, embodiments disclosed herein are not limited thereto, and the requested video may also be sent directly to video requester 130 after being processed by video provider 110, and will be reconstructed or converted at video requester 130.

It should be understood that the structure and functions of environment 100 are described for illustrative purposes only and do not imply any limitation to the scope of the present disclosure. For example, embodiments of the present disclosure may also be applied to an environment different from environment 100. In order to explain principles of the above solution more clearly, the process of image processing will be described below in more detail on a video provider side and a video receiver (i.e., an edge node or video requester) side, respectively, with reference to FIG. 2 and FIG. 4.

Figure 2:
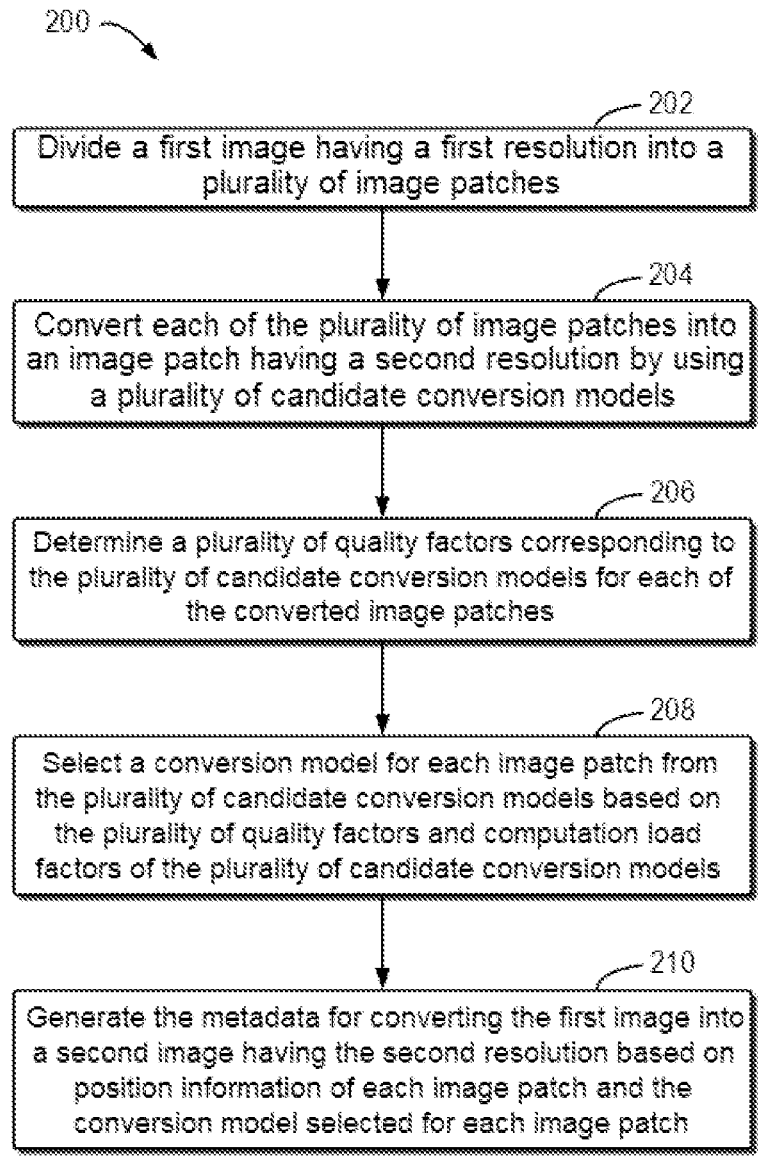
FIG. 2 shows a flow chart of a process for generating metadata according to an embodiment of the present disclosure.

FIG. 2 shows a flow chart of process 200 for generating metadata according to an embodiment of the present disclosure. In some embodiments, process 200 may be implemented in video provider 110 in FIG. 1. Process 200 for processing an image to generate metadata according to embodiments of the present disclosure will now be described with reference to FIG. 2 and in combination with FIG. 1. For ease of understanding, specific examples mentioned in the following description are all illustrative and are not used to limit the protection scope of the present disclosure.

At 202, video provider 110 may divide a first image having a first resolution into a plurality of image patches. It will be appreciated that the first image described in the present disclosure may be an image or a video containing a plurality of image frames. In some embodiments, video provider 110 may first convert a video having a high resolution to a video having a low resolution. The low resolution is the above-described first resolution. Then, video provider 110 may divide each image frame in the video having the low resolution into a plurality of data blocks. It will also be appreciated that video provider 110 may also directly divide each image frame of the video having the low resolution into a plurality of data blocks without the image conversion operation which reduces the resolution.

Figure 3:
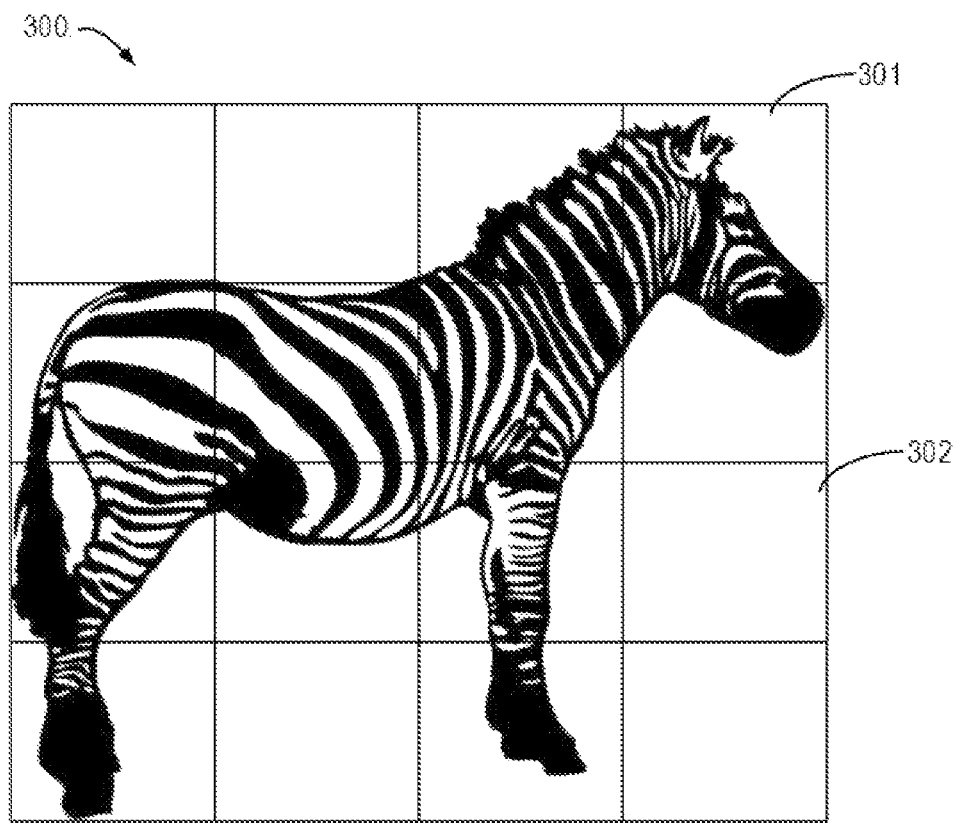
FIG. 3 shows a schematic diagram of dividing an image into a plurality of image patches according to an embodiment of the present disclosure.

FIG. 3 shows a schematic diagram of dividing image 300 into a plurality of image patches according to an embodiment of the present disclosure. As shown in FIG. 3, video provider 110 may divide image 300 into a plurality of image patches, including image patch 301, image patch 302, and other image patches. It will be appreciated that each of the divided image patches has information of a position in the above-described video having the low resolution, i.e., position information. As an example, the position information of image patch 301 may be expressed as [F1, L1, R1], and the position information of image patch 302 may be expressed as [F1, L1, R3]. F1 (and other similar frame indicators such as F2, F3, . . . ) are used to represent a particular frame in which the image patch is located, L1 (and other similar column indicators such as L2, L3, . . . ) are used to represent a particular column (abscissa) of the image patch in the frame, and R1 (and other similar row indicators such as R2, R3, . . . ) are used to represent a particular row (ordinate) of the image patch in the frame.

As can be seen in FIG. 3, each image patch in image 300 has a different level of complexity. Performing a high-resolution or super-resolution reconstruction process on the entire image is inefficient. In order to achieve efficient high-resolution reconstruction, embodiments of the present disclosure divide image 300 into a plurality of image patches, utilize a high-complexity conversion model in subsequent processing to reconstruct high-complexity image patches (e.g., a portion of a zebra head contained by image patch 301) and utilize a low-complexity conversion model to reconstruct low-complexity image patches (e.g., a blank portion contained by image patch 302).

Returning to FIG. 2, at 204, video provider 110 may convert each of the plurality of image patches into an image patch having a second resolution by using a plurality of candidate conversion models. It will be appreciated that the second resolution is higher than the first resolution described above and the second resolution may be the above-described high resolution.

In some embodiments, the plurality of candidate conversion models may include at least two conversion models, i.e., a first conversion model having a first computation load and a second conversion model having a second computation load, and the first computation load is smaller than the second computation load. In this way, the efficiency of image reconstruction is improved, computation is saved, and the processing time of image reconstruction is shortened. It will be appreciated that some embodiments of the present disclosure by way of illustrative example consider the case where a conversion model with a high computation load necessarily outputs a high-quality reconstructed image, and do not consider the case where a conversion model with a high computation load outputs a low-quality reconstructed image.

As an example, the first conversion model may be a simple algorithm such as bicubic interpolation, and the second conversion model may be a deep learning model. Therefore, the operation duration of the first conversion model is short (the computation load is small), but the quality of an image converted by the first conversion model is low. Accordingly, the operation duration of the second conversion model is long (the computation load is large), but the quality of an image converted by the second conversion model is high.

As another example, the plurality of candidate conversion models may include three conversion models, i.e., a first conversion model having a first computation load, a second conversion model having a second computation load, and a third conversion model having a third computation load, where the first computation load is smaller than the second computation load, and the second computation load is smaller than the third computation load. The first conversion model may be a simple algorithm such as bicubic interpolation, the second conversion model may be a structurally simple deep learning model, and the third conversion model may be a structurally complex deep learning model.

It will be appreciated that through the above operations, conversion results corresponding to a plurality of conversion models, i.e., image patches having a second resolution, may be obtained for each image patch in each image frame in the video. Therefore, a decision-making approach to model selection is needed to select the most appropriate conversion model for each image patch in each image frame for use in the image reconstruction operations of the video receiver.

At 206, video provider 110 may determine a plurality of quality factors corresponding to the plurality of candidate conversion models for each of the converted image patches. Taking image 300 in FIG. 3 as an example, when an image patch is processed by three different conversion models, quality factors [A1, B1, C1] of three conversion results of image patch 301 and quality factors [A2, B2, C2] of three conversion results of image patch 302 may be determined. It will be appreciated that quality factors A1 and A2 may correspond to the conversion results of the above-described first conversion model, quality factors B1 and B2 may correspond to the conversion results of the above-described second conversion model, and quality factors C1 and C2 may correspond to the conversion results of the above-described third conversion model.

In some embodiments, the quality factor may be an indicator, such as a Peak Signal-to-Noise Ratio (PSNR) and a Structural Similarity (SSIM), used to determine how close a reconstructed or converted image is to an original high-resolution image (i.e., truth-value image). It will be appreciated that the quality factor is higher as the reconstructed image is closer to the original high-resolution image.

At 208, video provider 110 may select a conversion model for each image patch from these candidate conversion models based on the plurality of quality factors and computation load factors of the plurality of candidate conversion models. It will be appreciated that the computation load factors are used to represent the computation load, effort, or operation duration required for each candidate conversion model to perform an image conversion or image reconstruction operation. In order to achieve high-resolution image reconstruction more efficiently, a conversion model with a low computation load and a short operation time may be selected for an image patch with a low complexity, or may also be understood as an image patch with a low quality requirement, and a conversion model with a high computation load and a long operation time may be selected for an image patch with a high complexity, or may also be understood as an image patch with a high quality requirement. In this way, the duration of the reconstruction operation for the entire image or the entire video can be reduced.

It will be appreciated that several decision-making approaches may be determined for the selection of a model to select the most appropriate conversion model for the corresponding image patch. In some embodiments, for each image patch, the first conversion model is selected for the image patch if it is determined that a difference between a second quality factor of the image patch corresponding to the second conversion model and a first quality factor of the image patch corresponding to the first conversion model is smaller than or equal to a first predetermined threshold. In other words, if the quality of the image in which the image patch is converted by the two conversion models is similar, a first conversion model with a lower computation load and a shorter operation time may be selected for the image patch. Otherwise, a second conversion model with a higher computation load and a longer operation time may be selected for the image patch.

In some embodiments, for each image patch, the first conversion model is selected for the image patch if it is determined that a ratio of a difference between a second quality factor of the image patch corresponding to the second conversion model and a first quality factor of the image patch corresponding to the first conversion model to the first quality factor is smaller than or equal to a second predetermined threshold. In this embodiment, the degree of change in the quality factors of the conversion results of the two conversion models is considered. That is, if both the first quality factor and the second quality factor have a high score, it can be considered that the quality factors such as the first quality factor and the second quality factor do not change greatly, even if the first quality factor and the second quality factor have a certain difference. In this case, it is still possible to select a first conversion model with a lower computation load and a shorter operation time for the image patch. Otherwise, a second conversion model with a higher computation load and a longer operation time may be selected for the image patch. It will be appreciated that the above-described solution may be extended to a case of three conversion models, four conversion models, or even more conversion models. It will also be appreciated that the above-described selection strategy may also be adjusted based on user preferences. As an example, the above-mentioned first predetermined threshold or second predetermined threshold may be adjusted when a user is more inclined to ensure the quality of the reconstructed image or is more inclined to shorten the reconstruction processing time.

At 210, video provider 110 may generate the metadata for converting the first image into a second image having the second resolution based on position information of each image patch and the conversion model selected for each image patch. Taking FIG. 3 as an example, video provider 110 may record a conversion model corresponding to image patch 301 of image 300 in the video in the metadata, i.e., [F1, L1, R1, M2]. F1 is used to represent a frame in which the image patch is located, L1 is used to represent a column (abscissa) of the image patch in the frame, R1 is used to represent a row (ordinate) of the image patch in the frame, and M2 is used to represent the above-described second conversion model.

In some embodiments, the first image may be a first video including a plurality of image frames, and the second image may be a second video including a plurality of image frames. Taking FIG. 1 as an example, video provider 110 may send the first video and the above-described metadata to video requester 130 to convert the first video into the second video. Alternatively or additionally, video provider 110 may send the first video and the above-described metadata to edge node 120 to convert the first video to the second video, and edge node 120 may send the second video having the high resolution to video requester 130.

Figure 4:
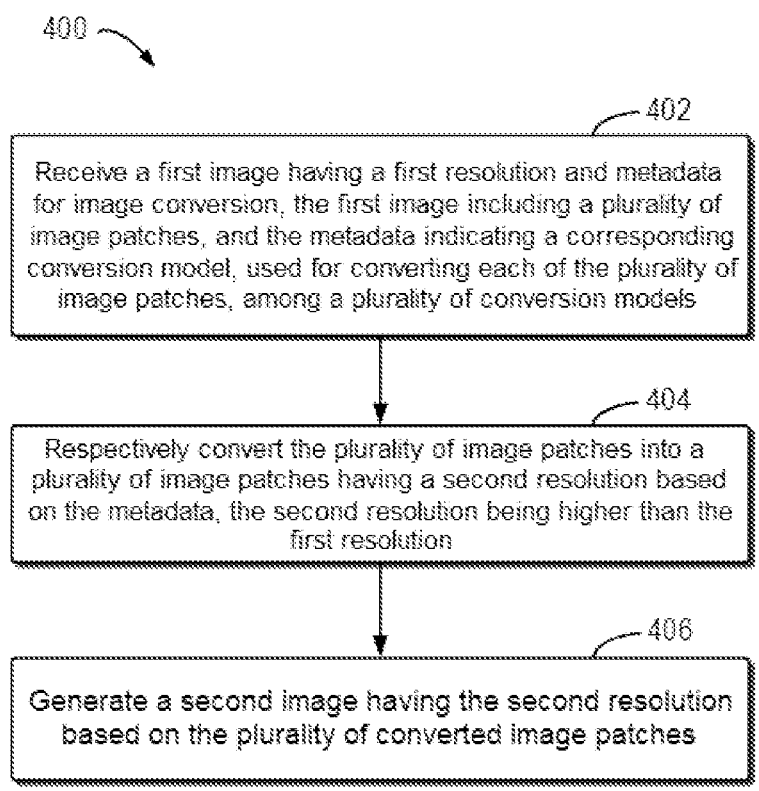
FIG. 4 shows a flow chart of a process for image processing according to an embodiment of the present disclosure.

FIG. 4 shows a flow chart of process 400 for image processing according to an embodiment of the present disclosure. In some embodiments, process 400 may be implemented in edge node 120 or video requester 130 in FIG. 1. Process 400 for high-resolution image reconstruction according to embodiments of the present disclosure will now be described with reference to FIG. 4 and in combination with FIG. 1. For ease of understanding, specific examples mentioned in the following description are all illustrative and are not used to limit the protection scope of the present disclosure.

At 402, edge node 120 or video requester 130 may receive a first image having a first resolution and metadata for image conversion. It will be appreciated that the first image includes a plurality of image patches, and the metadata is used to indicate a corresponding conversion model, used for converting each of the plurality of image patches, among a plurality of conversion models.

In some embodiments, the metadata may be generated based on position information of each image patch and a conversion model selected for each image patch, the plurality of candidate conversion models may include at least a first conversion model having a first computation load and a second conversion model having a second computation load, and the first computation load is smaller than the second computation load. In this way, the efficiency of image conversion can be improved, the computation can be saved, and delay due to the reconstruction can be shortened.

In some embodiments, for each image patch, it may be determined that the conversion model selected for the image patch is the first conversion model if it is determined that a difference between a second quality factor of the image patch corresponding to the second conversion model and a first quality factor of the image patch corresponding to the first conversion model is smaller than or equal to a first predetermined threshold.

In some embodiments, for each image patch, it may be determined that the conversion model selected for each image patch is the first conversion model if it is determined that a ratio of a difference between a second quality factor of the image patch corresponding to the second conversion model and a first quality factor of the image patch corresponding to the first conversion model to the first quality factor is smaller than or equal to a second predetermined threshold.

At 404, edge node 120 or video requester 130 may respectively convert the plurality of image patches into a plurality of image patches having a second resolution based on the above-described metadata, the second resolution being higher than the first resolution.

Also, at 406, edge node 120 or video requester 130 may generate a second image having the higher second resolution based on the plurality of converted image patches.

Figure 5:
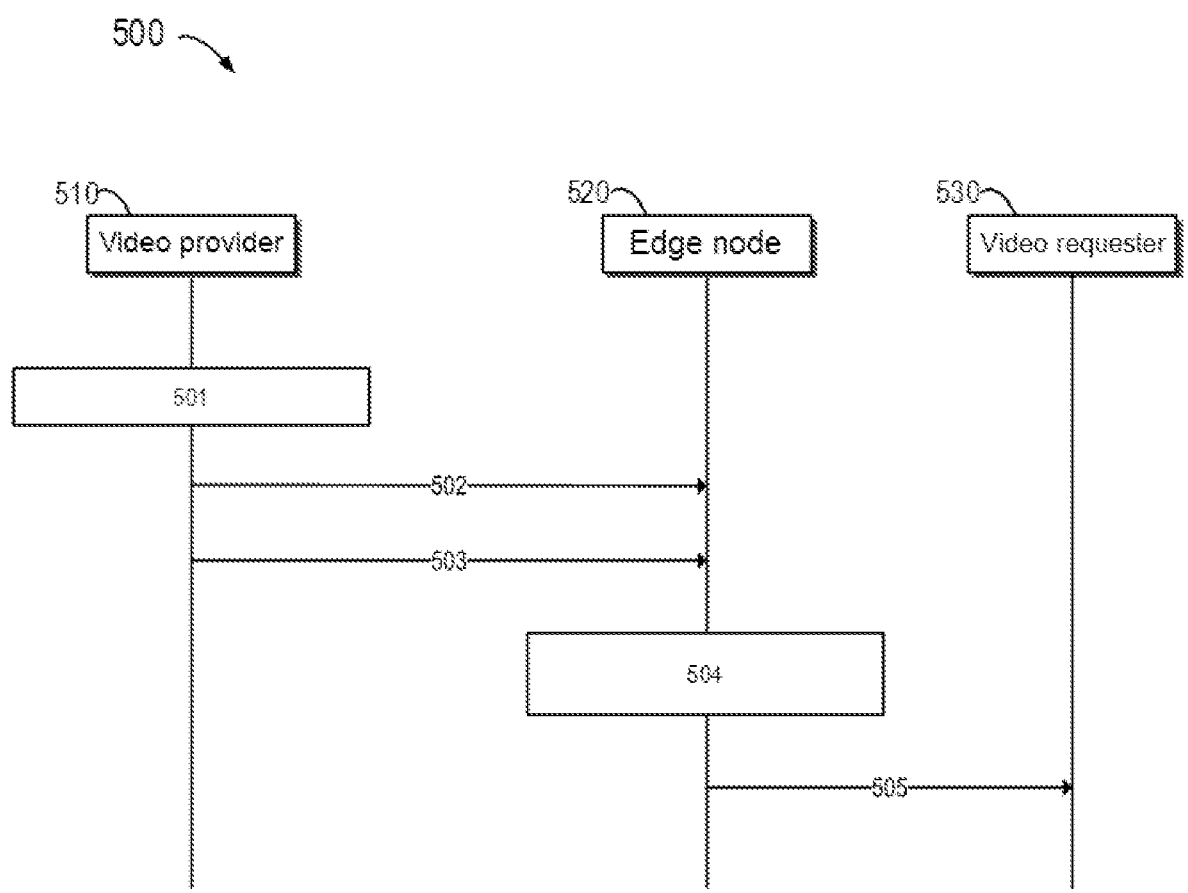
FIG. 5 shows a high-level pipeline diagram of a process for transmitting a video from a video provider to a video requester according to an embodiment of the present disclosure.

In order to illustrate principles of the present disclosure more clearly, FIG. 5 shows a high-level pipeline diagram of process 500 for transmitting a video from a video provider to a video requester according to an embodiment of the present disclosure.

As shown in FIG. 5, before video provider 510 such as a video website or a game engine sends a video having a low resolution to video requester 530, video provider 510 needs to generate 501 metadata in advance, and a conversion model corresponding to each image patch in each image frame in the above-described video having the low resolution is recorded in the metadata. As described above, the conversion model may be selected from a plurality of candidate conversion models based on computation load factors of these candidate conversion models and quality factors of the converted image patches.

Then, video provider 510 may transmit 502 the video having the low resolution to edge node 520 adjacent to video requester 530 in response to a request (not shown) from video requester 530, and simultaneously or sequentially transmit 503 the above-described metadata to edge node 520. Edge node 520, upon receiving the video having the low resolution and the metadata, performs image reconstruction 504 by using the conversion model selected for each image patch in the metadata, not frame by frame, but image patch by image patch. After the image reconstruction is completed, edge node 520 transmits 505 the reconstructed image to video requester 530. Alternatively or additionally, image reconstruction may be performed directly by video requester 530 instead of via edge node 520.

Through the above-described embodiments, the present disclosure reconstructs high-resolution videos in image patches, in contrast to conventional ways of reconstructing high-resolution videos in frames, and utilizes a plurality of candidate models of different degrees of complexity to selectively reconstruct image patches. Therefore, the present disclosure enables computational scheduling of image reconstruction on a finer scale such that limited computational resources can be utilized more efficiently. In addition, the processing time of image reconstruction is also shortened due to the saving of computation, so that the reconstruction of high-resolution videos or images can be applied to the real-time communication field. In addition, the present disclosure also provides a plurality of ways to select a suitable conversion model for an image patch, so that the reconstruction efficiency of an image and a video can be improved, the reconstructed image meets user requirements in terms of quality and delay, and the user experience is improved.

Figure 6:
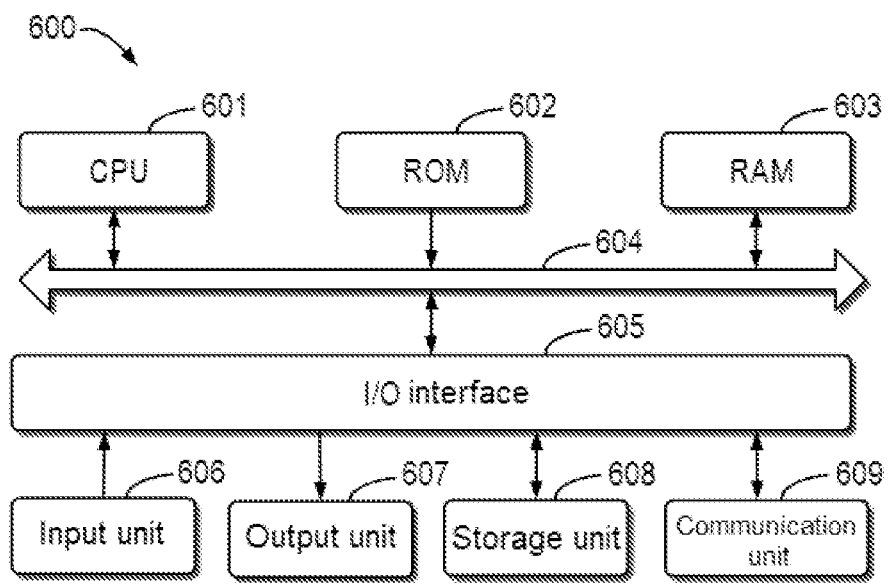
FIG. 6 shows a block diagram of an example device that may be configured to implement an embodiment of the present disclosure.

FIG. 6 shows a schematic block diagram of example electronic device 600 that may be configured to implement an embodiment of the present disclosure. For example, electronic device 600 may be configured to implement edge node 120 as shown in FIG. 1. As shown in the figure, electronic device 600 includes CPU 601 that may perform various appropriate actions and processing according to computer program instructions stored in read-only memory (ROM) 602 or computer program instructions loaded from storage unit 608 into random access memory (RAM) 603. In RAM 603, various programs and data required for the operation of device 600 may also be stored. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

CPU 601 performs the various methods and processing described above, such as processes 200 and 400. For example, in some embodiments, the various methods and processing described above may be implemented as a computer software program or a computer program product, which is tangibly included in a machine-readable medium, such as storage unit 608. In some embodiments, part of or all the computer program may be loaded and/or installed onto device 600 via ROM 602 and/or communication unit 609. When the computer program is loaded into RAM 603 and executed by CPU 601, one or more steps of any process described above may be implemented. Alternatively, in other embodiments, CPU 601 may be configured in any other suitable manners (for example, by means of firmware) to perform a process such as processes 200 and 400.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various implementations of the present disclosure have been described above. The foregoing description is illustrative rather than exhaustive, and is not limited to the disclosed implementations. Numerous modifications and alterations will be apparent to persons of ordinary skill in the art without departing from the scope and spirit of the illustrated implementations. The selection of terms used herein is intended to best explain the principles and practical applications of the implementations or the improvements to technologies on the market, so as to enable persons of ordinary skill in the art to understand the implementations disclosed herein.

What is claimed is:

1. A method for generating metadata, comprising:
   dividing a first image having a first resolution into a plurality of image patches;
   converting each of the plurality of image patches into an image patch having a second resolution by using a plurality of candidate conversion models, the second resolution being higher than the first resolution;

determining a plurality of quality factors corresponding to the plurality of candidate conversion models for each of the converted image patches;

selecting a conversion model for each image patch from the plurality of candidate conversion models based on the plurality of quality factors and computation load factors of the plurality of candidate conversion models; and generating the metadata for converting the first image into a second image having the second resolution based on position information of each image patch and the conversion model selected for each image patch.

2. The method according to claim 1, wherein the plurality of candidate conversion models comprise at least a first conversion model having a first computation load and a second conversion model having a second computation load, the first computation load being smaller than the second computation load.

3. The method according to claim 2, wherein selecting the conversion model for each image patch comprises:

selecting, for each image patch, the first conversion model for the image patch responsive to determining that a difference between a second quality factor of the image patch corresponding to the second conversion model and a first quality factor of the image patch corresponding to the first conversion model is smaller than or equal to a first predetermined threshold.

4. The method according to claim 2, wherein selecting the conversion model for each image patch comprises:

selecting, for each image patch, the first conversion model for the image patch responsive to determining that a ratio of a difference between a second quality factor of the image patch corresponding to the second conversion model and a first quality factor of the image patch corresponding to the first conversion model to the first quality factor is smaller than or equal to a second predetermined threshold.

5. The method according to claim 1, wherein the first image is a first video comprising a plurality of image frames and the second image is a second video comprising a plurality of image frames, the method further comprising:

sending the first video and the metadata to a video requester to convert the first video into the second video.

6. The method according to claim 5, wherein the position information indicates positions of each image patch in corresponding image frames of the first video and the second video.

7. The method according to claim 1, further comprising:

receiving the first image having the first resolution and the metadata for image conversion, the first image comprising the plurality of image patches, and the metadata indicating a corresponding conversion model, used for converting each of the plurality of image patches, among the plurality of candidate conversion models;

respectively converting the plurality of image patches into a plurality of image patches having the second resolution based on the metadata; and generating the second image having the second resolution based on the plurality of converted image patches.

8. The method according to claim 7, wherein the metadata is generated based on position information of each image patch and a conversion model selected for each image patch, and a plurality of candidate conversion models comprise at least a first conversion model having a first computation load and a second conversion model having a second computation load, the first computation load being smaller than the second computation load.

9. The method according to claim 8, wherein for each image patch, the conversion model selected for the image patch is the first conversion model responsive to determining that a difference between a second quality factor of the image patch corresponding to the second conversion model and a first quality factor of the image patch corresponding to the first conversion model is smaller than or equal to a first predetermined threshold.

10. The method according to claim 8, wherein for each image patch, the conversion model selected for the image patch is the first conversion model responsive to determining that a ratio of a difference between a second quality factor of the image patch corresponding to the second conversion model and a first quality factor of the image patch corresponding to the first conversion model to the first quality factor is smaller than or equal to a second predetermined threshold.

11. An electronic device, comprising:

a processor; and a memory coupled to the processor and having instructions stored therein which, when executed by the processor, cause the electronic device to perform actions comprising:

dividing a first image having a first resolution into a plurality of image patches;

converting each of the plurality of image patches into an image patch having a second resolution by using a plurality of candidate conversion models, the second resolution being higher than the first resolution;

determining a plurality of quality factors corresponding to the plurality of candidate conversion models for each of the converted image patches;

selecting a conversion model for each image patch from the plurality of candidate conversion models based on the plurality of quality factors and computation load factors of the plurality of candidate conversion models; and generating metadata for converting the first image into a second image having the second resolution based on position information of each image patch and the conversion model selected for each image patch.

12. The electronic device according to claim 11, wherein the plurality of candidate conversion models comprise at least a first conversion model having a first computation load and a second conversion model having a second computation load, the first computation load being smaller than the second computation load.

13. The electronic device according to claim 12, wherein selecting the conversion model for each image patch comprises:

selecting, for each image patch, the first conversion model for the image patch responsive to determining that a difference between a second quality factor of the image patch corresponding to the second conversion model and a first quality factor of the image patch corresponding to the first conversion model is smaller than or equal to a first predetermined threshold.

14. The electronic device according to claim 12, wherein selecting the conversion model for each image patch comprises:

selecting, for each image patch, the first conversion model for the image patch responsive to determining that a ratio of a difference between a second quality factor of the image patch corresponding to the second conversion model and a first quality factor of the image patch corresponding to the first conversion model to the first quality factor is smaller than or equal to a second predetermined threshold.

15. The electronic device according to claim 11, wherein the first image is a first video comprising a plurality of image frames and the second image is a second video comprising a plurality of image frames, the actions further comprising:
sending the first video and the metadata to a video requester to convert the first video into the second video;
wherein the position information indicates positions of each image patch in corresponding frames of the first video and the second video.

16. The electronic device according to claim 11, wherein the actions further comprise:
receiving the first image having the first resolution and the metadata for image conversion, the first image comprising the plurality of image patches and the metadata indicating a corresponding conversion model, used for converting each of the plurality of image patches, among the plurality of candidate conversion models;
respectively converting the plurality of image patches into a plurality of image patches having the second resolution based on the metadata; and
generating the second image having the second resolution based on the plurality of converted image patches.

17. The electronic device according to claim 16, wherein the metadata is generated based on position information of each image patch and a conversion model selected for each image patch, and a plurality of candidate conversion models comprise at least a first conversion model having a first computation load and a second conversion model having a second computation load, the first computation load being smaller than the second computation load.

18. The electronic device according to claim 17, wherein for each image patch,
the conversion model selected for the image patch is the first conversion model responsive to determining that a difference between a second quality factor of the image patch corresponding to the second conversion model and a first quality factor of the image patch corresponding to the first conversion model is smaller than or equal to a first predetermined threshold.

19. The electronic device according to claim 17, wherein for each image patch,
the conversion model selected for the image patch is the first conversion model responsive to determining that a ratio of a difference between a second quality factor of the image patch corresponding to the second conversion model and a first quality factor of the image patch corresponding to the first conversion model to the first quality factor is smaller than or equal to a second predetermined threshold.

20. A computer program product tangibly stored on a non-transitory computer-readable medium and comprising machine-executable instructions that, when executed by a machine, cause the machine to execute a method for generating metadata, the method comprising:
dividing a first image having a first resolution into a plurality of image patches;
converting each of the plurality of image patches into an image patch having a second resolution by using a plurality of candidate conversion models, the second resolution being higher than the first resolution;
determining a plurality of quality factors corresponding to the plurality of candidate conversion models for each of the converted image patches;
selecting a conversion model for each image patch from the plurality of candidate conversion models based on the plurality of quality factors and computation load factors of the plurality of candidate conversion models; and
generating the metadata for converting the first image into a second image having the second resolution based on position information of each image patch and the conversion model selected for each image patch.

* * * * *